April 1, 1958 E. ROOT 3RD 2,829,257

TRANSISTOR OSCILLATOR CIRCUIT

Filed Nov. 9, 1956

INVENTOR.
Elihu Root 3RD
BY
Richard von K. Brune
ATTORNEY.

United States Patent Office 2,829,257

Patented Apr. 1, 1958

2,829,257

TRANSISTOR OSCILLATOR CIRCUIT

Elihu Root 3d, Clinton, N. Y., assignor to R. E. Dietz Company, Syracuse, N. Y., a corporation of New York Application November 9, 1956, Serial No. 621,343

10 Claims. (Cl. 250—36)

Figure 1:
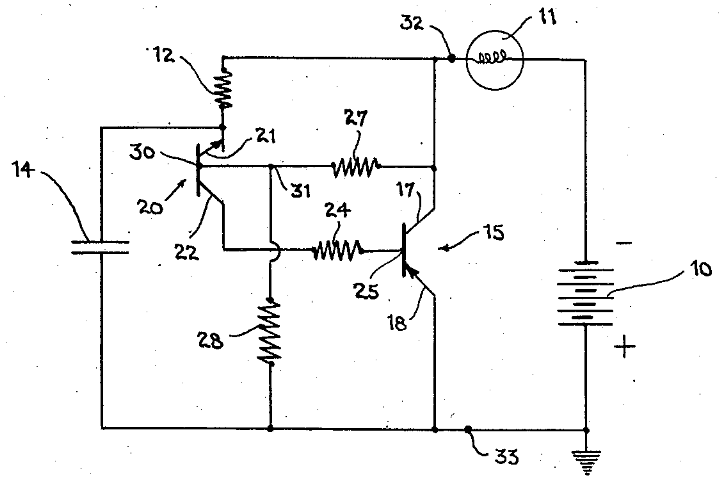

This invention relates generally to electrical signal generators or oscillator circuits, and has particular reference to such circuits wherein semi-conductor devices are utilized.

The circuit of the invention is particularly adapted for use in flasher type warning lamps or lanterns, such as may be used to warn motorists of road repairs or disabled vehicles, although it will be apparent as the description proceeds that it can also be advantageously employed for various other purposes. Heretofore, however, considerable difficulty has been experienced with the portable, battery operated types of flasher lamps that are presently available, and it is the primary purpose of the invention to overcome these difficulties. Thus, in most of the portable flasher lamps now in use there has been difficulty due to excessive wear on mechanically operated make and break contacts which affects both the reliability and longevity of the lamp, or relatively high operating voltages are required necessitating a voltage build up and a more complex and cumbersome arrangement.

Accordingly, with the foregoing and other considerations in view, it may be stated that the primary object of the present invention is to provide an electronic switching device, particularly adapted for use in a flasher warning lamp, which is reliable, durable and compact.

Another important object of the invention is to provide an electronic switching device for a flasher warning lamp which is simple and economical in construction and also is highly stable and efficient in operation.

A further important object of the invention is to provide an electronic switching device which operates on a low voltage source of direct current.

A still further important object of the invention is to provide an electronic switching device wherein the timing of the operating cycles is uniform and closely controlled.

A more specific object of the invention is to provide a transistor oscillator circuit employing a pair of coacting transistors.

Another specific object of the invention is to provide a transistor oscillator circuit wherein a low value capacitor is employed to render said transistors conductive.

Still another specific object of the invention is to provide a transistor oscillator circuit wherein the effect of variations in the internal resistance of the transistors is reduced to a minimum.

Other objects and advantages of the invention will become apparent from the following detailed description thereof read in conjunction with the accompanying drawings which illustrate a representative embodiment of the invention for the purpose of disclosure.

Figure 2:
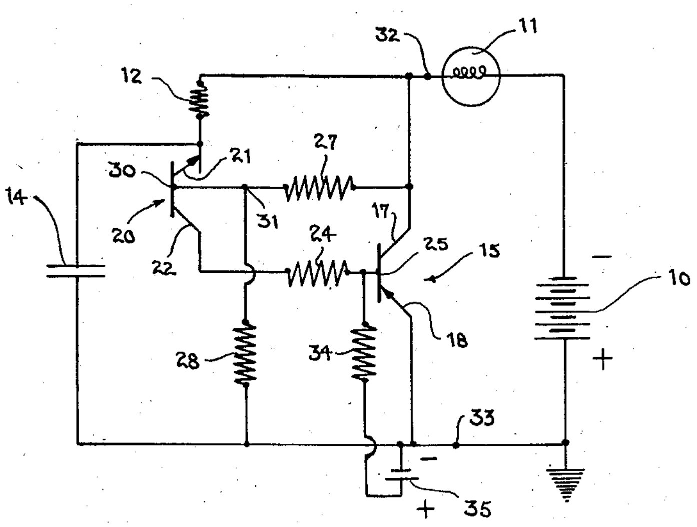

In the drawings:

Figure 1 is a schematic circuit diagram of a transistor oscillator circuit arranged in accordance with the present invention; and Figure 2 is a slightly modified form of the circuit shown in Figure 1.

Having reference now to the drawings, wherein like reference numbers designate the same elements in each of the views, and with particular reference to Figure 1, 10 indicates a source of direct current which, for the type of flasher warning lamp contemplated, is preferably in the form of a 6 volt battery. The positive terminal of the battery 10 is connected to a point of reference potential or ground, while the negative terminal thereof is connected in series with a load 11, resistor 12 and capacitor 14, the opposite side of the latter being connected to the point of reference potential. The load of course is in the form of an electric lamp bulb when the circuit is used as a flasher warning device.

Connected across the battery 10 and lamp 11 is a semiconductor device 15 in the form of a junction transistor of the PNP type, the collector electrode 17 of the transistor being connected to the lamp and the emitter electrode 18 thereof being connected to the point of reference potential. The circuit also includes a junction transistor 20 of the NPN type, the emitter electrode 21 of this transistor being connected to a point between the resistor 12 and capacitor 14, and the collector electrode 22 thereof being connected through a resistor 24 to the base electrode 25 of transistor 15. A voltage divider comprising resistors 27, 28 is also connected in circuit across the battery 10 and lamp 11, and the base electrode 30 of transistor 20 is connected to the voltage divider at a point 31 between the resistors.

It will be noted that the transistor oscillator or flasher portion of the above described circuit is arranged so that it has but a single pair of terminals 32, 33 which are connected in series with the lamp and battery. This arrangement enables the flasher portion to be constructed as a separate unit which greatly facilitates the assembly of the parts in the lantern and also reduces the number of connections needed therein.

The operation of the above described circuit is substantially as follows: At the start of a cycle, capacitor 14 is in a substantially discharged state and transistors 15 and 20 are not conducting. Battery 10 supplies a small current through the lamp 11 and through the resistors 27, 28 comprising the voltage divider. This current holds the base electrode 30 of transistor 20 at an intermediate potential which may be, for example, three-fourths of the battery potential. At the same time, a small current passes through the lamp and through resistor 12, gradually charging capacitor 14. The values of resistors 12, 27 and 28 are chosen so that these two currents are insufficient to cause a substantial voltage drop in the lamp, and do not cause the lamp to light or contribute materially to the average battery drain.

As capacitor 14 charges, the emitter 21 of transistor 20 becomes more negative, and eventually it becomes slightly more negative than the intermediate potential at the base 30 of the transistor. When this happens, a control current flows from the emitter to the base of transistor 20 and to the point of reference potential through resistor 28, and the transistor begins to conduct. The load current of the transistor then flows through resistor 24 to the base 25 of transistor 15, where it constitutes a control current for the latter. As a result, transistor 15 begins to conduct and draws a heavy load current through lamp 11.

The voltage drop in the lamp causes the potential at the collector 17 of transistor 15 to become more positive, and this in turn causes the base potential of transistor 20 to become more positive. In the meantime, the emitter potential of transistor 20 is momentarily held close to its most negative value by capacitor 14. Additional control current flows through transistor 20 as a result of its more positive base potential and this in turn provides more load current for transistor 15. The regenerative process just described produces a rapid switching action which quickly brings both transistors to a state of full conduction, and lights the lamp. During this period, when the lamp is lighted, the collector potential of transistor 15 may be only a few tenths of a volt negative.

The load and control currents for transistor 20 are supplied entirely by the capacitor 14 which discharges mainly through resistor 24. Eventually the potential of the capacitor falls so low that it cannot maintain sufficient control current for full conduction by one transistor or the other, and when this happens a reverse switching action sets in. The collector 17 of transistor 15 then becomes more negative, and in turn the base 25 becomes more negative than the emitter 18 which is now momentarily held close to ground potential by capacitor 14. Both transistors therefore are completely shut off, which brings the base 30 of transistor 20 back to its original intermediate potential, and a new cycle begins.

During the period of the flash, when the lamp is on, resistor 27 acts to prevent the drawing of an unnecessarily large control current for transistor 20. Similarly, resistor 24 acts to prevent the drawing of unnecessary load current by this transistor. Together these resistors, and in particular resistor 24, by preventing too rapid a discharge of capacitor 14 serve to stretch out the flash without reducing its efficiency, and allow the use of a smaller capacitor than otherwise would be required. At the same time, the effect of variations in the internal resistances of the transistors is reduced.

In a constructed embodiment of the invention, the following circuit constants were used, and these are listed herein merely by way of example and are not intended in any way to limit the invention:

| | | |
|---|---|---|
| Resistor **12** | ohms | 2200 |
| Resistor **24** | do | 220 |
| Resistor **27** | do | 2200 |
| Resistor **28** | do | 6800 |
| Capacitor **14** | microfarads | 300 |
| Direct current source | volts | 6 |

It is well known that transistors are subject to leakage currents in the path between collector and base. Such leakage currents increase with temperature and also vary according to the quality of the transistor. In the circuit as shown in Figure 1 the leakage currents of both transistors enter the base 25 of transistor 15 and are amplified by transistor 15 during the time when the lamp is supposed to be off. In unfavorable circumstances the amplified leakage current could cause an objectional increase in the average battery drain and could even cause the lamp to fail to shut off between cycles. In the circuit of Figure 2 the leakage currents are by-passed to ground through a resistor 34, thereby eliminating the objectionable amplified leakage current. Resistor 34 alone, connected between base and emitter of transistor 15 may by-pass sufficient leakage current, but may require a compromise between the amount of leakage current by-passed and the avoidance of excessive shunting of the proper control current of transistor 15 during the part of the cycle when the lamp is on. The addition of a bias cell 35 in series with resistor 34 allows all of the leakage current to be by-passed while resistor 34 remains at a high enough value to avoid any substantial shunting of proper control current. However, for economy and simplicity the omission of bias cell 35 may be preferable in some cases.

While the invention has been described with transistor 15 as a PNP type and transistor 20 as an NPN type for the purpose of disclosure, it will be understood that the two transistors could be interchanged in the circuit by reversing the polarity of the battery, the only requirement in this connection being that the two transistors be complementary.

The invention may be embodied in other specific forms without departing from the spirit or essential characteristics thereof. The embodiment disclosed is therefore to be considered in all respects as illustrative and not restrictive, the scope of the invention being indicated by the appended claims.

What is claimed is:

1. In an electronic switching circuit: a source of direct current, a load, resistance means and a capacitor in series; a first transistor having its collector and emitter electrodes connected across said source and load; a second transistor having its emitter electrode connected between said resistance means and capacitor and its collector electrode connected to the base electrode of said first transistor; and means in said circuit to establish a potential less than that of said source at the base electrode of said second transistor; said capacitor serving to alter the potential at the emitter electrode of said second transistor relative to the potential established at the base electrode thereof whereby said second transistor is rendered conductive and energizes the base electrode of said first transistor to enable a closed circuit to be temporarily established through said source, load and first transistor.

2. A circuit as defined in claim 1 including a second resistance means in said connection between the collector electrode of said second transistor and the base electrode of said first transistor.

3. In an electronic switching circuit: a source of direct current, a load, a resistance and a capacitor in series; a first transistor having its collector and emitter electrodes connected across said source and load; a voltage divider connected across said source and load; a second transistor having its emitter electrode connected between said resistance and capacitor and its collector electrode connected to the base electrode of said first transistor; and means connecting the base electrode of said second transistor with an intermediate point between the ends of said voltage divider to establish an intermediate potential which is less than that of said source at the former; said capacitor serving to alter the potential at the emitter electrode of said second transistor relative to said intermediate potential at the base electrode thereof whereby said second transistor is rendered conductive and energizes the base electrode of said first transistor to enable a closed circuit to be temporarily established through said source, load and first transistor.

4. A circuit as defined in claim 3 including a second resistance in said connection between the collector electrode of said second transistor and the base electrode of said first transistor.

5. In a transistor oscillator circuit: a source of direct current, a load, a resistance and a capacitor in series; a first normally non-conducting transistor having base, emitter and collector electrodes, the emitter-collector path of said transistor being in series with said source and load; a second normally non-conducting transistor having base, emitter and collector electrodes, the emitter electrode of said second transistor being connected between said rsistance and capacitor; a second resistance connecting the collector electrode of said second transistor with the base electrode of said first transistor; and means in said circuit to establish an intermediate potential which is less than that of said source on the base electrode of said second transistor; said capacitor serving to alter the potential at the emitter electrode of said second transistor relative to said intermediate potential at the base electrode thereof whereby said second transistor is rendered conductive and energizes the base electrode of said first transistor to enable a closed circuit to be temporarily established through said source, load and first transistor.

6. In a transistor oscillator circuit: a source of direct current having one terminal connected to a point of reference potential; a load, a resistor and a capacitor connected in series to the other terminal of said source and thence to said point of reference potential; a PNP transistor connected across said source and load, the collector electrode of said transistor being connected to the circuit between said load and resistor and the emitter electrode of said transistor being connected to said point of reference potential; an NPN transistor having its emitter electrode connected to said circuit between said resistor and capacitor; a second resistor connecting the collector electrode of said NPN transistor with the base electrode of said PNP transistor; a voltage divider connected at one terminal to the circuit between said load and first-named resistor and at the other terminal to said point of reference potential; and means connecting the base electrode of said NPN transistor with an intermediate point between the ends of said voltage divider to establish an intermediate potential between that of said source and reference potential at the electrode; said capacitor serving to increase the potential at the emitter electrode of said NPN transistor over that at the base electrode thereof whereby said NPN transistor is rendered conductive and transmits a control current to the base electrode of said PNP transistor to render it conductive thereby enabling a closed circuit to be temporarily established through said source, load and PNP transistor.

7. A circuit as defined in claim 6 together with a third resistor and a bias cell in series connecting the base electrode of said PNP transistor with said point of reference potential.

8. In a transistor oscillator circuit: an NPN transistor; a source of direct current one terminal of which is connected to a point of reference potential; means including a load and a resistor connecting the other terminal of said source to the emitter electrode of said transistor to apply a biasing potential thereto; a PNP transistor having its collector electrode connected to the circuit between said load and resistor and its emitter electrode connected to said point of reference potential; means connecting the collector electrode of said NPN transistor to the base electrode of said PNP transistor; means in said circuit to apply a biasing potential to the base electrode of said NPN transistor approximately equal to that applied to the emitter electrode thereof; and means connecting the emitter electrode of said NPN transistor with said point of reference potential and energizable to increase the biasing potential on the emitter electrode so that said NPN transistor is rendered conductive and energizes the base electrode of said PNP transistor to enable a closed circuit to be temporarily established through said source, load and PNP transistor.

9. In a transistor oscillator circuit: a first semi-conductor in the form of an NPN transistor; means for providing a unidirectional biasing potential to said NPN transistor, said means having one terminal connected to a point of reference potential; load means in series with a first resistor connecting the other terminal of said biasing means with the emitter electrode of said NPN transistor; capacitor means connecting said emitter electrode with said point of reference potential; a second semi-conductor in the form of a PNP transistor connected across said load and biasing means, the collector electrode of said PNP transistor being connected to said load means and the emitter electrode thereof being connected to said point of reference potential; a voltage divider comprising a second and a third resistor connecting said load means with said point of reference potential; means connecting the base electrode of said NPN transistor with said voltage divider between said second and third resistors to apply to said electrode an intermediate potential between that of said biasing means and reference potential; and a fourth resistor connecting the collector electrode of said NPN transistor with the base electrode of said PNP transistor; said capacitor means being energized by said biasing means to increase the potential at the emitter electrode of said NPN transistor beyond the potential at the base electrode thereof so that said NPN transistor is rendered conductive and energizes the base electrode of said PNP transistor to enable a closed circuit to be temporarily established through said biasing means, load and PNP transistor.

10. A circuit as defined in claim 9 together with a fifth resistor and bias potential means in series connecting the base electrode of said PNP transistor with said point of reference potential.

References Cited in the file of this patent

UNITED STATES PATENTS 2,788,449 Bright ------------------ Apr. 9, 1957